United States Patent [19]

McCoy et al.

[11] 3,920,560

[45] Nov. 18, 1975

[54] DRILLING FLUID

[75] Inventors: David R. McCoy; Mahmoud S. Kablaoui, both of Wappingers Falls, N.Y.

[73] Assignee: Texaco Inc., New York, N.Y.

[22] Filed: June 27, 1974

[21] Appl. No.: 483,599

[52] U.S. Cl............. 252/8.5 C; 252/353; 260/340.5
[51] Int. Cl.²............................................. C09K 7/02
[58] Field of Search........ 252/8.5 C, 353; 260/340.5

[56] References Cited
UNITED STATES PATENTS

| | | | |
|---|---|---|---|
| 3,558,487 | 1/1971 | Stratton | 252/8.5 |
| 3,586,628 | 6/1971 | Kolaian | 252/8.5 |

OTHER PUBLICATIONS

Tishchenko et al., Article in Journal of Applied Chemistry of the U.S.S.R., Vol. 35, No. 3, Mar. 1962, pp. 611–619.

*Primary Examiner*—Herbert B. Guynn
*Attorney, Agent, or Firm*—T. H. Whaley; C. G. Ries; James F. Young

[57] ABSTRACT

An aqueous drilling fluid dispersant and a method of drilling wells using as the drilling fluid dispersant a water soluble salt of a sulfonated, dialkyl substituted benzodioxole of prescribed type.

6 Claims, No Drawings

DRILLING FLUID

This invention relates to a novel aqueous drilling fluid for drilling wells through sub-surface formations by means of well drilling tools, and particularly to such an aqueous well drilling fluid having improved dispersibility as a result of containing therein a novel dispersant as hereinafter more fully described. The invention is also concerned with a method of drilling wells employing the novel aqueous drilling fluid.

Drilling fluids, or muds as they are sometimes called, are slurries of clayey solids used in the drilling of wells for tapping underground collections of oil, gas, brine or water. Such fluids have a number of different functions, the most important of which are to assist in the removal of cuttings from the well, to seal off formations of gas, oil or water which may be encountered at different levels, to lubricate the drilling tool and drill pipe which carries the tool, and to hold the cuttings in suspension in event of shut-downs in drilling.

An ideal drilling fluid is a thixotropic collodial system, i.e., a fluid which on agitation or circulation (as by pumping or otherwise), has a measurable relatively low viscosity and is free flowing (not plastic), particularly at high temperatures; but when such agitation or circulation is halted, the fluid sets or gels. The rate of gel formation is such as to permit the cuttings to fall only a short distance before the gel structure is sufficiently strong to support them.

When such a drilling fluid having the proper viscosity, the proper gel rate and proper gel strength is circulated through a well bore, it has a sufficiently high viscosity to carry the cuttings and sand from the bottom of the hole to the surface and it has a gel rate such as to allow the cuttings and sand to settle in a settling pit. On standing in a quiescent state, it develops sufficient gel strength to prevent the settling of the cuttings, sand or weighting material, etc., in the well bore when it becomes necessary to discontinue circulation for any appreciable period of time. Such a fluid is also characterized by its ability to form a mud cake on the borehole wall, thereby assisting in sealing off the traversed formations and inhibiting so-called water loss, i.e., loss of water from the drilling fluid.

One of the principal problems in mud chemistry is the production of suitable drilling fluids having satisfactory dispersibility, and the necessary thixotropic properties discussed above.

In accordance with the present invention the problems of dispersibility in aqueous drilling fluids can be solved by incorporating in an aqueous drilling fluid as the dispersant a water soluble salt of a sulfonated, dialkyl substituted benzodioxole having the general formula

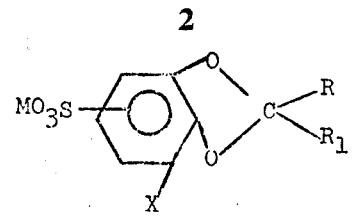

wherein R and R1 each is an alkyl group containing from 1 to about 15 carbon atoms, wherein M is a water soluble cation such as sodium, potassium, lithium, ammonium, and X is a hydrogen atom $-SO_3H$ or $-SO_3M$ wherein M is selected from the group consisting of sodium, potassium, lithium and ammonium.

Representative compounds include the mono- and di- sodium and potassium salts of mono- and di-sulfonates of the 2,2 dialkyl substituted benzodioxoles, particularly those wherein each of the alkyl groups contains from 2 to 10 carbon atoms, such as ethyl, propyl, butyl, hexyl, octyl and decyl, including the corresponding isomers.

The sulfonated dialkyl substituted benzodioxole compounds of the present invention are prepared in the manner disclosed and claimed in our copending patent application Ser. No. 483,598, filed simultaneously herewith, entitled "Method of Preparation of Sulfonated, Dialkyl-substituted Benzodioxoles", and incorporated herein by reference.

The sulfonated, dialkyl-substituted benzodioxole compounds of the present invention may be added to an aqueous drilling fluid in amounts ranging from about 0.1 pound to about 4 pounds per barrel of drilling fluid. In general, it has been found that amounts less than 0.1 pound per barrel do not produce completely satisfactory results in terms of dispersing activity whereas amounts above about 4 pounds per barrel are not effective. A preferred range for the compounds of the present invention is from about 0.2 to about 2 pounds per barrel of drilling fluid for most consistent results and efficiency.

Yield Point (YP) is calculated by subtracting the Plastic Viscosity (PV) from the Fann Viscosity reading at 300 rpm. Plastic Viscosity (PV) is obtained by calculation, subtracting the Fann reading at 300 rpm from the 700 rpm reading. Apparent Viscosity (AV) is equal to one half of the Fann Viscosity reading obtained at 600 rpm. The fluidity of a mud can be back calculated from these data, the results being expressed in Fann Viscosity at 600 rpm and 300 rpm for a direct reading viscosimeter.

The properties of the base mud is shown in the table. Prior to evaluation the mud containing the indicated dispersant was treated with caustic to attain the desired pH and the samples were aged overnight at 140°F.

TABLE

| Ex. | Additional Additive lbs. | Type | Amount (lbs./bbl.) and Type Dispersant | PV | YP | Ap. Vis. Cpe | pH |
|---|---|---|---|---|---|---|---|
| — | | Mud Base mud | — | 10.5 | 84.5 | 52.8 | 8.4 |
| 1. | | LpH[(1)] | 0.5 (A)* | 19.5 | 26.5 | 32.8 | 9.7 |
| A | | LpH[(1)] | 0.5 (B)** | 25 | 17 | 33.5 | 9.5 |
| 2. | | LpH[(1)] | 1.0 (A)* | 28 | 15.5 | 35.5 | 9.9 |
| B | | LpH[(1)] | 1.0 (B)** | 30.5 | 29 | 45 | 9.5 |
| 3. | | LpH[(1)] | 2.0 (A)* | 24 | 14.5 | 31.3 | 11.2 |
| C | | LpH[(1)] | 2.0 (B)** | 21 | 40.5 | 41.5 | 9.4 |

TABLE-continued

| Ex. | Additional Additive lbs. | Type | Amount (lbs./bbl.) and Type Dispersant | PV | YP | Ap. Vis. Cpe | pH |
|---|---|---|---|---|---|---|---|
| | | Mud | | | | | |
| 4. | | LpH[1] | 4.0 (A)* | 16 | 29.5 | 30.8 | 12 |
| D | | LpH[1] | 4.0 (B)** | 22.5 | 57.5 | 51.3 | 9.4 |
| 5. | | LpH[1] | 8.0 (A)* | 5 | 112 | 61 | 12.3 |
| E | | LpH[1] | 8.0 (B)** | 15.5 | 53 | 42 | 9.4 |

[1]LpH — Low pH Field Mud
*(A) Sodium, 2, 2 Diethyl-1, 3, Benzodioxole-5-Sulfonate
**(B) 4-Methyl Catechol Representative physical properties of the drilling fluid both before and after addition of the compounds of the present invention are shown in the table. In each example the amount of material or materials added to the base mud, if any, is shown, expressed in terms of pounds of material per barrel of drilling fluid.

Inspection of the data in the above table shows that the compounds of the present invention are good dispersants at concentrations of from about 0.5 up to about 4 pounds per barrel in a low pH drilling fluid. They are superior to 4-methyl catechol at these concentrations. However, their effectiveness is diminished at high concentrations of about 8 pounds per barrel as shown by Example 5 probably due to the alkaline nature of these compounds.

We claim:

1. An aqueous drilling fluid containing clay solids and as the disperant from about 0.1 to about 4 pounds per barrel of drilling fluid of a water soluble salt of a sulfonated, dialkyl-substituted benzodioxole compound having the general formula

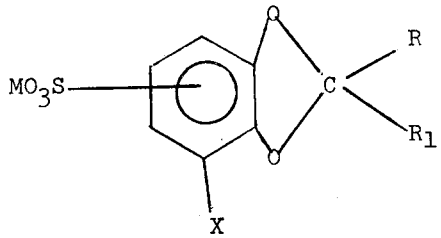

wherein R and $R_1$ each is an alkyl group containing from 1 to 15 carbon atoms, M is a water soluble cation selected from the group consisting of sodium, potassium, lithium —$SO_3H$ or —$SO_3M$ wherein M is selected from the group consisting of sodium, potassium, lithium and ammonium.

2. An aqueous drilling fluid as claimed in claim 1 wherein said benzodioxole compound is present in the drilling fluid in an amount of from about 0.2 to about 2 pounds per barrel of drilling fluid.

3. An aqueous drilling fluid as claimed in claim 1 wherein said benzodioxole compound is the sodium salt of 2, 2 diethyl-1,3-benzodioxole-5-sulfonic acid.

4. In a method of drilling wells wherein a drilling fluid is passed through the well in contact with earth formations during the drilling operation, the improvement which comprises contacting said earth formations with an aqueous drilling fluid containing clay solids and as the dispersant from about 0.1 pound to about 4 pounds per barrel of drilling fluid of a water soluble salt of a sulfonated, dialkyl-substituted benzodioxole compound having the general formula

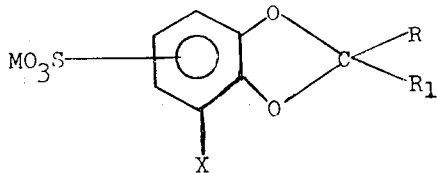

wherein R and R1 each is an alkyl group containing from 1 to 15 carbon atoms, M is a water soluble cation selected from the group consisting of sodium, potassium, lithium and ammonium, X is a hydrogen atom, —$SO_3H$ or —$SO_3M$ wherein M is selected from the group consisting of sodium, potassium, lithium and ammonium.

5. A method as claimed in claim 4 wherein said benzodioxole compound is present in the drilling fluid in an amount of from about 0.2 to about 2 pounds per barrel of drilling fluid.

6. A method as claimed in claim 4 wherein said benzodioxole compound is the sodium salt of 2, 2 diethyl-1,3-benzodioxole-5-sulfonic acid.

* * * * *